Patented Mar. 17, 1953

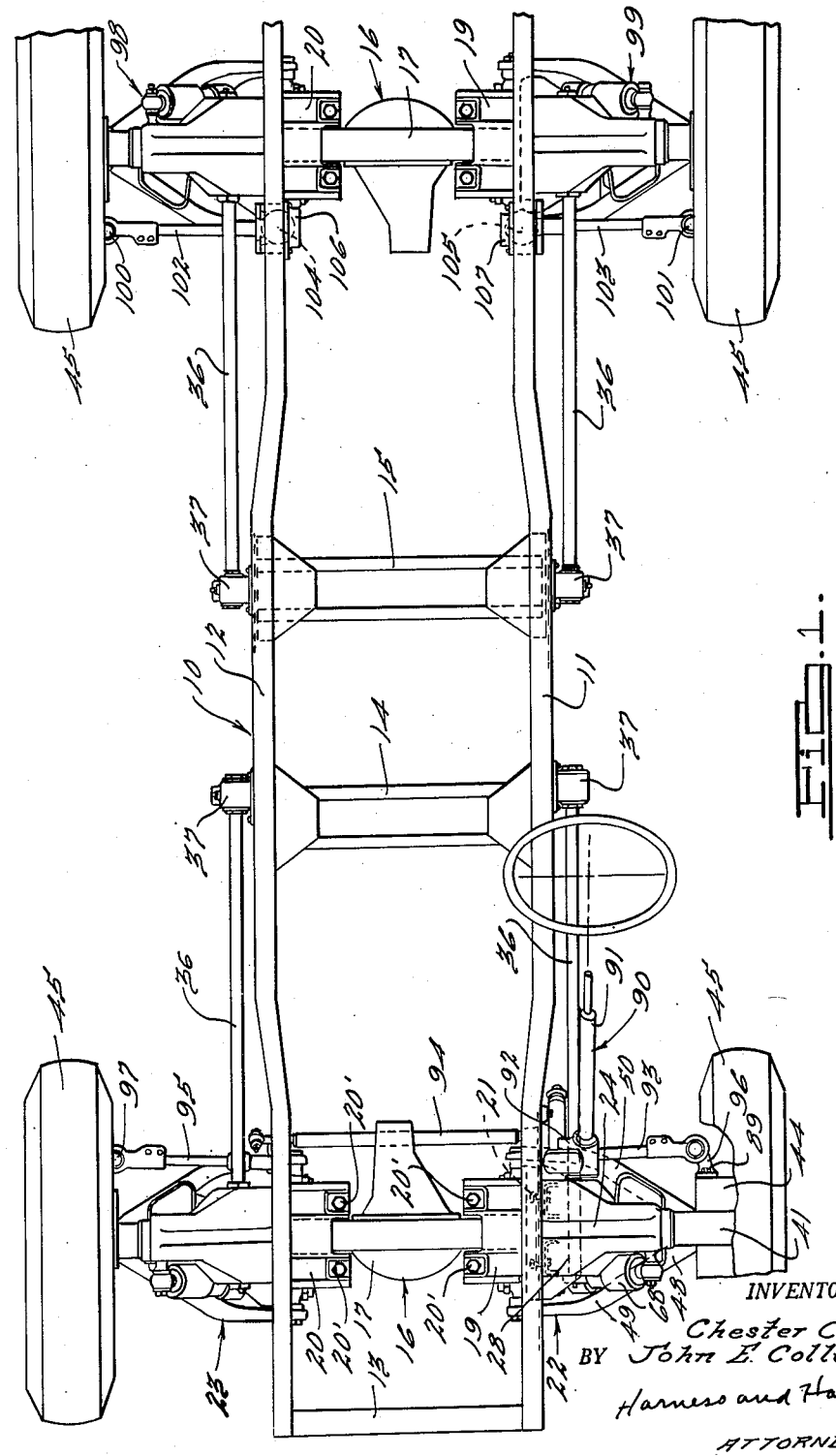

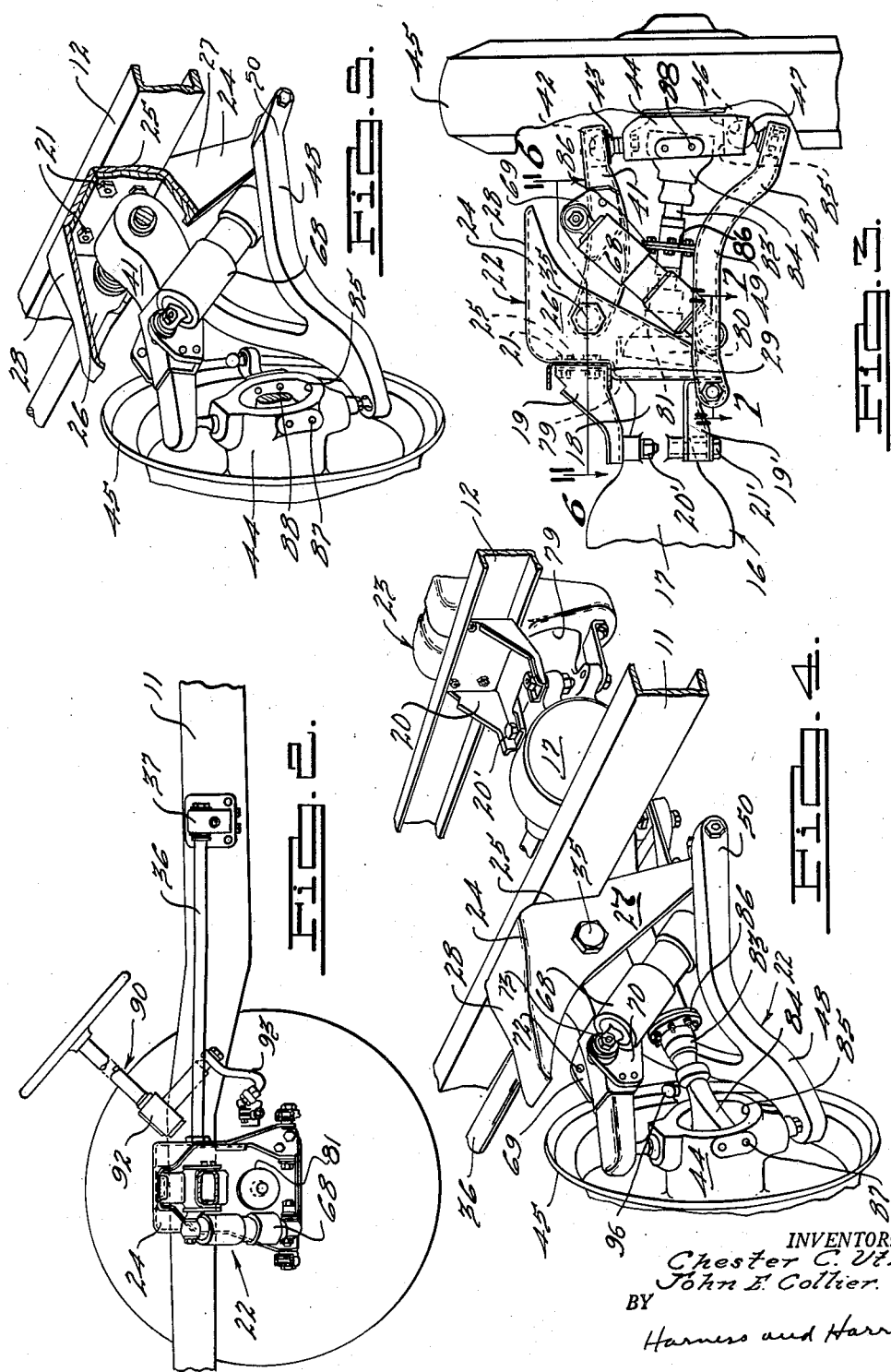

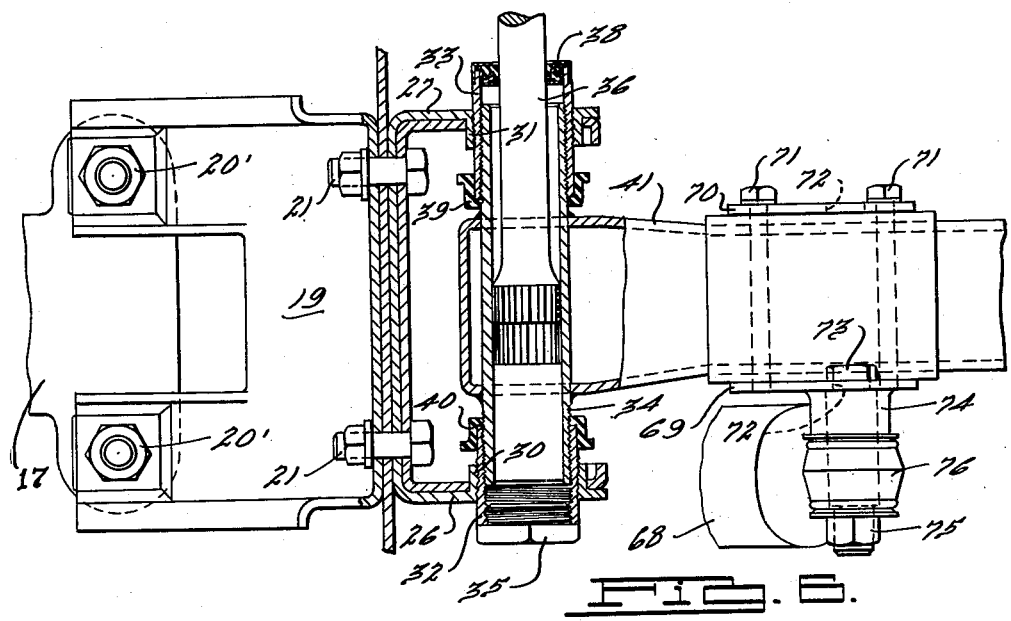

2,631,681

UNITED STATES PATENT OFFICE 2,631,681

INDIVIDUAL SUSPENSION MOUNTING FOR DRIVEN WHEELS

Chester C. Utz, Detroit, and John E. Collier, Highland Park, Mich., assignors to Chrysler Corporation, Highland Park, Mich., a corporation of Delaware Application September 9, 1948, Serial No. 48,464

2 Claims. (Cl. 180—44)

Our invention relates to motor vehicles and more particularly to improved motor vehicle wheel suspension assemblies.

It is a principal object of our invention to provide a motor vehicle with a plurality of wheel suspension assemblies to thereby independently suspend each of the wheels of the vehicle in a novel and improved manner.

It is another object of our invention to provide a motor vehicle with a plurality of wheel suspension assemblies each of which being so constructed to interchangeably detachably mount each wheel of the vehicle at any wheel supporting station on the vehicle.

Another object of our invention is to provide a motor vehicle with a plurality of substantially identical wheel suspension assemblies which are so constructed that each assembly may be replaced by a standard assembly common to all.

Still a further object of our invention is to provide a motor vehicle with a plurality of independent wheel suspension assemblies having improved simplicity of construction and capable of being manufactured at relatively low cost.

Another object of our invention is the provision of an improved vehicle frame structure wherein the differential axle housings of the vehicle are employed to support the side rails of the frame structure.

Other objects and advantages will become more apparent from the following description of one embodiment of our invention, reference being made to the accompanying drawings, in which:

Fig. 1 is a plan view of a motor vehicle frame structure embodying our improved suspension assemblies;

Fig. 2 is a fragmentary side elevational view of the vehicle frame structure embodying our invention;

Fig. 3 is a front elevational view of the structure shown in Fig. 2;

Fig. 4 is a fragmentary perspective view of one end of the frame structure embodying our improved suspension;

Fig. 5 is a fragmentary perspective view similar to Fig. 4 with portions cut away;

Fig. 6 is an enlarged sectional view taken on the line 6—6 of Fig. 3;

Fig. 7 is a detail enlarged sectional view taken on the line 7—7 of Fig. 3.

In the drawings, we have shown a motor vehicle chassis, generally designated by numeral 10, comprising a pair of substantially parallel, longitudinally extending side rails 11 and 12. The side rails 11 and 12 are of a channeled configuration and are provided with transversely extending supporting cross brace members 13, 14, and 15 which are welded to the side rails and serve to hold them in assembled relationship. For the purpose of description, the chassis 10 may be conveniently divided into two sections. As viewed in Fig. 1, the section on the left embodies the steerable wheels while the section on the right embodies the non-steerable wheels.

The section on the left comprises an axle housing, generally designated by the numeral 16, having a differential housing 17 and two oppositely extending tubular portions 18, each of which is adapted to cover portions of a vehicle axle 83 which extends outwardly from the differential housing 17. The axle housing 16 is retained relative to the side rails 11 and 12 by bracket members 19 and 20. The innermost extremities of the bracket members 19 and 20 are secured by bolts 20' to the upper side of the tubular portions 18 adjacent the differential housing 17. The other extremities of the bracket members 19 and 20 are bolted to the side rails 11 and 12, respectively, by nut and bolt assemblies 21. Wheel suspension assemblies, generally designated by the numerals 22 and 23, are disposed on the outer faces of the side rails 11 and 12, respectively. The assembly 22 is identical to the assembly 23 with minor exceptions hereinafter described. For this reason, a description of one will suffice for both. Like parts in each assembly have been given like numbers.

The assembly 22 includes a bracket 24 having an upright inner wall portion 25 which is bolted to the side rail 11 by bolts 21, and a pair of substantially parallel side wall portions 26 and 27 extending outwardly therefrom. These wall portions 26 and 27 are of generally triangular configuration and are integrally connected at their upper ends, as more clearly shown in Figs. 3 and 4, by horizontal wall 28. The wall 25 is provided with a shoulder portion 29 offset inwardly of the chassis for seating on the lower edge of the side rail 11. The side walls 26 and 27 are respectively provided with registering integral threaded couplings 30 and 31 receiving bushings 32 and 33, which are threaded on the opposed extremities of an internally splined sleeve 34. The bushing 32 has, also, a closure plug 35 threaded therein.

The sleeve 34 is adapted to receive one extremity of a torsion bar 36. This extremity is also splined and is disposed within the sleeve 34 intermediate its end portions. The other extremity of the torsion bar 36 is fixed to the side rail by a torsion bar anchoring mechanism 37. The bushing 33 is provided with an oil seal 38 adjacent its one end thereof while its other end is provided with a dust seal 39. The bushing 32 is provided with a dust seal 40 at the extremity opposite to the extremity adjacent the closure plug 35.

The sleeve 34 has welded thereto intermediate its end portions an inner extremity of an upper control arm 41. The outer extremity of the upper control arm is provided with a ball joint socket 42 which receives a ball member 43. The ball member 43 is connected to a drum member 44 which rotatably carries a wheel 45. The member 44 is provided with a ball joint socket 46 disposed on the opposite side thereof from the ball member 43 and receives a ball member 47 which is connected to the outer extremity of a wishbone or lower control arm 48. The lower control arm 48 is provided with legs 49 and 50 which in turn are provided with threaded couplings 51 and 52, respectively. The couplings 51 and 52 are threaded on bushings 53 and 54, respectively, which in turn are threaded on threaded extremities 55 and 56 of a lower control arm rod 57'. The rod 57' is secured to the lowermost extremity of the bracket 24 by nut and bolt assemblies 57 and 58, as more clearly shown in Fig. 7. The nut and bolt assemblies 57 and 58 also serve to rigidly fix bracket members 59, 60, and 61 to the lower end of the bracket 24. Brackets 59 and 60 are each provided with outwardly extending flanges which together form a leg 62 while brackets 60 and 61 are similarly provided with flanges which together form a leg 63. Each of the legs 62 and 63 is provided with a coupling 64 and 65, respectively, which may be employed to receive a bolt 66 which in turn fixes the lower end 67 of a shock absorber 68. It is apparent that the stud 66 may be positioned in either coupling 64 or coupling 65 depending upon which side of the assembly 22 the shock absorber 68 is to be mounted. The bracket 24 is further supported relative to the axle housing 16 by a bracket 19' which is secured at its outer end to the bracket 24 by nut and bolt assemblies 57 and 58 and at its inner end to the under side of the portion 18 by bolts 21'.

The upper control arm is provided with plates 69 and 70 which are bolted to the respectively opposite vertical surfaces of the arm 41 by bolts 71. Each of the plates 69 and 70 is provided with apertures 72 for receiving bolts 73 which in cooperation with a collar 74 and a nut 75 serve to retain the upper end portion 76 of the shock absorber 68 in position. The bolt 73 may connect the upper end portion 76 of the shock absorber 78 to either plate 69 or plate 70 depending upon which side of the assembly 22 the shock absorber 68 is mounted. If the upper end 76 of the shock absorber 68 is connected to the plate 69, then the lower end 67 would be connected to the leg 62, which is formed by the brackets 59 and 60. Similarly, if the upper end 76 of the shock absorber 68 were connected to the plate 70, then the lower end 67 would be connected to the leg 63 which is formed by the brackets 60 and 61, as more clearly shown in Figs. 6 and 7.

The wall portion 25 of the bracket 24 is provided with an opening 79 for receiving an enlarged cup-like end 80 of the tubular member 18. This enlarged end 80 acts as a portion of a universal joint and receives therein a portion of a cup-like section 81 which encloses a portion of the axle 83 of the vehicle.

A cup-like member 84 encloses another portion of the axle 83 and is receivable within an opening 85 in the drum member 44 and acts as a universal joint therewith. In this manner the axle 83 extends from the differential housing 17 through the member 18, the cup-like end 80, the section 81, the member 84, and is connected to the wheel 45 through the opening 85 in the drum member 44. The axle 83 is uncovered between the section 81 and the member 84 and is separable at a point 86 for reasons hereinafter described.

The drum member 44 is provided with apertures 87 and 88 which are adapted to receive nut and bolt assemblies 89 for securing portions of a steering mechanism generally designated by the numeral 90. The mechanism 90 comprises a wheel and assembly 91 which actuates a control unit 92 which in turn operates links 93, 94, and 95. Links 93 and 95 are pivotally connected to links 96 and 97, respectively, which are secured to drum members 44 by nut and bolt assemblies 89 of suspension assemblies 22 and 23, respectively. The apertures 87 are employed when securing the link 97 to the drum member of assembly 23.

It should be noted that the suspension assemblies 22 and 23 are identical in structure with the exceptions that the torsion bar 36 is received in one of the assemblies through wall 26 and in the other through wall 27, and that in one assembly the shock absorber is mounted on one side of the upper control arm 41 while in the other the shock absorber is mounted on the other side of the control arm 41. This is true even though, as viewed in Fig. 1, the shock absorbers are on the sides of the assemblies 22 and 23 closest the end of the vehicle.

As viewed in Fig. 1, the section on the right comprises wheel suspension assemblies 98 and 99 which are identical to the assemblies 22 and 23 with the exception that the hub members 44 are connected to links 100 and 101 which are pivotally connected to links 102 and 103 respectively. The links 102 and 103 are provided with ball members 104 and 105, respectively, which in turn are disposed in ball sockets 106 and 107, respectively. The ball sockets 106 and 107 are secured to side rails 12 and 11, respectively. The links 100 and 101 serve to hold the respective wheels of the assemblies 98 and 99 in non-steerable alignment. The sockets 106 and 107 are so positioned on the side rails relative to the suspension assemblies that the wheels are allowed to move about their axes of suspension without departing from alignment.

In operation, each suspension assembly operates independently of the others. Axle housings 16 are disposed at each end of the vehicle and, therefore, accommodate four-wheel drive of the vehicle if desired.

Although not shown in the drawings for reasons of simplicity, the vehicle is provided with a conventional motor which may be mounted thereon preferably adjacent the assemblies 22 and 23. This motor together with the axle housings 16 and axles 83 form the power mechanism of the vehicle for rotating the wheels 45.

As heretofore described, the suspension assemblies 22, 23, 98, and 99 are identical with certain exceptions. Therefore, one standard suspension assembly is common to all. Each standard assembly generally comprises the bracket 24, the upper and lower control arms 41 and 48, respectively, the drum member 44 carrying the wheel 45, the shock absorber 68 mounted on either side of the suspension as desired, the cup-like member 84, and the portion of the axle 83 from the point 86 to the wheel 45. The bracket 19' is also a part of this assembly.

To mount this suspension on the frame structure 10, the bracket 24 is first secured by the nut and bolt assemblies 21 to either rail 11 or 12 depending on whether this suspension is to be suspension 22 or 99 on side rail 11 or suspension 23 or 98 on side rail 12. The torsion bar 36 may then be inserted within the sleeve 34 through either the wall 26 or 27 again depending on where the suspension is mounted. The end of the sleeve 34 not receiving the torsion bar is closed by the threaded plug 35. The shock absorber 68, if mounted on the proper side, is left alone. If, however, it is desirable to mount the shock absorber on the other side of the suspension, it may be done as heretofore described. Connection of the axle 83 at the point 86 may then be accomplished. The assembly is completed by connecting the drum member 44 to one of the links 95, 96, 100, or 101, depending upon at which point on the frame structure the suspension assembly is mounted.

Although but one embodiment of the invention is herein shown and described it will be understood that various changes in the details of construction and materials employed may be made without departing from the spirit of the invention.

We claim:

1. A motor vehicle comprising a frame structure including spaced longitudinally extending side rails and forwardly and rearwardly disposed axle and differential housings rigidly connected between said side rails, roadwheels, a plurality of wheel supporting means each supporting one of said wheels at a predetermined location on said frame structure adjacent one of said housings, each of said supporting means including a bracket having a first portion secured to one of said side rails and a second portion secured to one of said housings, each of said wheel supporting means further including linkage means pivotally connected at one end thereof to one of said brackets and wheel journalling means pivotally carried by the other end of said linkage means and mounting one of said wheels and spring means between said linkage means and frame structure, and a plurality of axle means each extending from one of said housings to one of said wheels, each of said axle means having separable sections to facilitate the removability and attachment of said wheel journalling means.

2. A motor vehicle comprising a frame structure including spaced longitudinally extending side rails and forwardly and rearwardly disposed axle and differential housings rigidly connected between said side rails, roadwheels, a plurality of wheel supporting means each supporting one of said wheels at a predetermined location on said frame structure adjacent one of said housings, each of said supporting means including a bracket having a first portion secured to one of said side rails and a second portion secured to one of said housings, upper and lower control arms each having one extremity pivotally carried by said bracket, wheel journalling means pivotally carried by the opposite extremities of said control arms and operatively connected to one of said wheels and a torsion bar having one end secured to one of said control arms and its opposite end detachably secured to said frame structure, and a plurality of axle means each extending from one of said housings to one of said wheels, each of said axle means having separable sections to facilitate the removability and attachment of said wheel journalling means.

CHESTER C. UTZ.
JOHN E. COLLIER.

REFERENCES CITED

The following references are of record in the file of this patent:

UNITED STATES PATENTS

| Number | Name | Date |
| --- | --- | --- |
| 1,780,370 | Tenny | Nov. 4, 1930 |
| 2,096,118 | Leighton | Oct. 19, 1937 |
| 2,103,590 | Lefevre | Dec. 28, 1937 |
| 2,103,624 | Lester | Dec. 28, 1937 |
| 2,162,828 | Slack | June 20, 1939 |
| 2,202,689 | Eliot | May 28, 1940 |
| 2,233,293 | Matthews | Feb. 25, 1941 |
| 2,455,429 | Lucien | Dec. 7, 1948 |
| 2,463,040 | MacPherson | Mar. 1, 1949 |

FOREIGN PATENTS

| Number | Country | Date |
| --- | --- | --- |
| 330,588 | Italy | Oct. 19, 1935 |
| 427,907 | Great Britain | May 2, 1935 |
| 457,089 | Great Britain | Nov. 20, 1936 |
| 464,472 | Great Britain | Apr. 15, 1937 |
| 556,241 | Great Britain | Sept. 27, 1943 |
| 695,658 | France | Oct. 6, 1930 |
| 769,604 | France | June 11, 1934 |